April 29, 1930.  C. H. HOLLUP  1,756,556
ELECTRODE HOLDER
Filed July 18, 1928
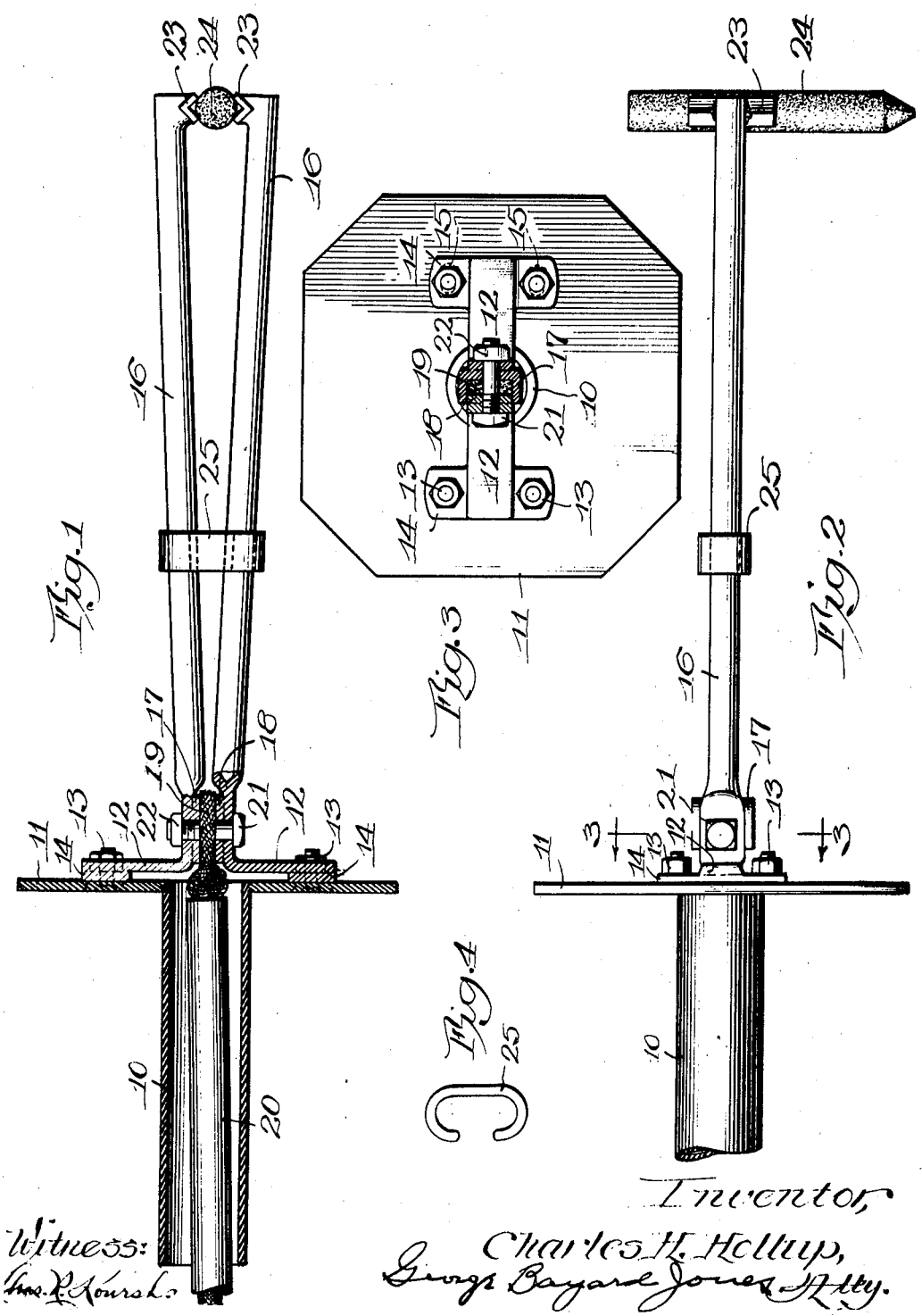

Patented Apr. 29, 1930

1,756,556

UNITED STATES PATENT OFFICE

CHARLES H. HOLLUP, OF CHICAGO, ILLINOIS, ASSIGNOR TO HOLLUP CORPORATION, A CORPORATION OF ILLINOIS

ELECTRODE HOLDER

Application filed July 18, 1928. Serial No. 293,761.

My invention relates to improvements in electrode holders.

Trouble has been experienced heretofore with the electrode holders now in use, as the handle becomes too hot despite attempts to minimize this defect.

One object of the present invention is to provide improved equipment of the character described in which this difficulty has been overcome.

Another object is to provide an improved clamping device in which electrodes of different sizes may be firmly clamped and from which they may be readily removed.

A further object is to provide improved means for connecting the cable to the electrode supporting arms.

In the accompanying drawings I have illustrated one embodiment of the invention.

Fig. 1 is a top plan view partly in section of the electrode holder.

Fig. 2 is a side elevation thereof,

Fig. 3 is a section on the line 3—3 of Fig. 2, and

Fig. 4 is an elevation of one of the parts.

The device in the form illustrated comprises a suitable handle which is made preferably of fiber or other heat insulating material, and which may have the form of a hollow tube, at one end of which is secured a transverse baffle or shield 11, which may also be of fiber or other suitable heat insulating material, and which may have screw threaded engagement with the handle 10.

A bracket 12 is bolted to the shield 11 as at 13, the bolts passing through cross arms 14 which are welded to the ends of the bracket 12, and constitute part thereof. The bolts passing through one of the cross arms 14 pass also through elongated openings or slots 15 in the shield 11, as shown in Fig. 3, the openings at the other end being circular.

The electrode supporting arms 16 consist preferably of metal tubes which diverge from each other in a V-shaped arrangement. Said tubes are flattened at one end as shown in Fig. 1, and in the present case these ends after being bent apart sufficiently, at right angles, comprise the brackets 12 previously referred to, although said bracket may be a separate member if desired. As shown in Fig. 3 a flattened portion of one tube has a short channel member 17 welded thereto, and the adjacent flattened portion of the other tube has a short plate 18 welded thereto and received within the flanges of said channel member thus providing clamping jaws which may be drawn together against the end of the cable or conductor 19 to afford good electrical contact with the two arms 16. The conductor, which is preferably a flexible copper conductor, has the usual insulation 20 surrounding it, and passes through the hollow handle 10 with ample air space on all sides to insure good ventilation of the handle. The clamping jaws referred to are brought together by a bolt 21 and nut 22, the slots 15 permitting this relative adjustment, although in some cases the slots are not necessary as the metal is somewhat resilient and the flattened portions may be forced together even though the turned out ends bear a fixed relation to each other.

The arms 16 are provided with jaws 23 which receive the electrode 24. The latter is shown as a carbon electrode although it may be a metallic electrode. The present design is one intended more particularly for heavy metallic electrodes or carbon electrodes, although similar structures may be designed equally well for use with light electrodes of any character. After the electrode is inserted between the jaws, the latter are clamped together by sliding the band 25 along the arm 16 to draw the outer ends together. Said band may be driven to its final position with a hammer if necessary, and when moved in the opposite direction the electrode is readily released.

It will be noted that the bracket 12 is spaced from shield 11 to provide an air space between the two. The flattened inner ends of the arms 16 are not connected to the hollow handle 10 but are turned apart and are connected by means of the cross pieces 14 and the bolts 13 to the heat insulating member 11 at points somewhat remote from the end of the handle 10. Thus heat conducted from the electrode through the metal arms 16 and the metal bracket 12 is largely dissipated, and such heat as remains is conducted through the material of the shield only very slowly, as a result of which the temperature of the handle 10 may be kept within practical limits. The shield 11 also acts as the usual barrier against radiated heat and serves in addition as a heat insulating member interposed between the handle and the heat conducting arms which support the electrode. It will be noted that the current divides, flowing through the two arms 16 in parallel and that the flattened portions thereof are sufficiently resilient to permit the necessary clamping movement when the band 25 is moved toward the electrode.

What I claim is:

1. An electrode holder comprising a metal clamp, a heat insulating member to which said clamp is secured and a handle also secured to said heat insulating member at a point remote from said clamp.

2. An electrode holder comprising a metal clamp, a heat insulating member to which said clamp is secured, a handle also secured to said heat insulating member at a point remote from said clamp said heat insulating member being arranged transversely and serving also as a shield against radiation.

3. An electrode holder comprising an adjustable clamp, a handle and a heat insulating member between the two and connected to each whereby it is supported by said handle and in turn supports said clamp.

4. An electrode holder comprising a pair of longitudinal metal members having electrode clamping jaws at one end, a support of heat insulating material to which the other ends of said members are secured and a handle secured to said heat insulating member.

5. An electrode holder comprising a pair of longitudinal metal members having electrode clamping jaws at one end, a support of heat insulating material to which the other ends of said members are secured and a handle secured to said heat insulating member, said handle being hollow and an insulated conductor passing through said handle and connected to said members.

6. An electrode holder comprising a pair of diverging members, a band engaging the same and arranged, when moved longitudinally to vary the distance between the free ends of said members, a conductor connected to the other ends of said members, a heat insulating member to which said last mentioned ends are secured, and a hollow handle also secured to said heat insulating member and surrounding said conductor.

7. An electrode holder comprising a tubular hand grip, a transverse shield of heat insulating material mounted on one end thereof, a metal bracket secured to said shield at a point remote from the juncture of said tubular member, a pair of arms each connected at one end to said bracket, jaws at the other ends of said arms, means for varying the distance between said jaws and a conductor passing through said tubular member and electrically connected to said arms.

8. An electrode holder comprising a tubular hand grip, a transverse barrier of heat insulating material having an opening therein fitting over one end of said tubular member, a bracket secured to said barrier and spanning said opening and spaced from the end of said tubular member, a pair of longitudinal conducting members secured at one end to said bracket and having jaws at the other end, and an insulated conductor of much less diameter than the inner diameter of said tubular member passing through the same and connected to said longitudinal members.

9. An electrode holder comprising a pair of metal pipes having jaws at one end and flattened at the other end to form resilient supports, said flattened ends being bent apart, a heat insulating shield to which said ends are secured, a conductor clamped between said flattened portions and a hollow handle surrounding said conductor and secured to said heat insulating member.

10. An electrode holder comprising a pair of metal pipes having jaws at one end and flattened at the other end to form resilient supports, a metal plate welded to one of said ends, a channel member welded to the other of said ends and embracing said plate, a conductor clamped between said plate and channel member, and a hollow handle surrounding said conductor to which said flattened ends are secured.

11. An electrode holder comprising a tubular member of heat insulating material, a transverse shield of heat insulating material secured to one end thereof and having slotted openings therein, an adjustable bracket bolted to said shield, and a conductor passing through said tubular member and engaged between the adjustable parts of said bracket.

12. A device of the class described comprising a barrier member having an opening therein, conducting electrode holding means secured to said barrier at points between said opening and the perimeter of the barrier, and a hollow handle attached to said barrier adjacent said opening and in registration therewith to permit the passage of a conductor through the handle and barrier into contact with said electrode holding means.

In testimony whereof, I have subscribed my name.

CHAS. H. HOLLUP.